United States Patent [19]
Taub

[11] 3,949,168

[45] Apr. 6, 1976

[54] SELECTIVELY CLAMPED DIGITAL SIGNAL TRANSMISSION SYSTEM

[75] Inventor: Daniel M. Taub, Winchester, England

[73] Assignee: International Business Machines Corporation, Armonk, N.Y.

[22] Filed: Nov. 4, 1974

[21] Appl. No.: 520,313

[30] Foreign Application Priority Data
Dec. 13, 1973 United Kingdom............ 57885/73

[52] U.S. Cl. ............................... 178/68; 178/69 R
[51] Int. Cl.² ........................................ H04L 25/08
[58] Field of Search ................ 178/68, 69 R, 69 B

[56] References Cited
UNITED STATES PATENTS

| | | | |
|---|---|---|---|
| 3,588,350 | 6/1971 | Higashide | 178/68 |
| 3,619,504 | 11/1971 | Veer | 178/68 |
| 3,671,671 | 6/1972 | Watanabe | 178/68 |
| 3,751,591 | 8/1973 | Radcliffe | 178/68 |

Primary Examiner—Benedict V. Safourek
Attorney, Agent, or Firm—John B. Frisone

[57] ABSTRACT

In a system including several devices connected by means of a common data bus the adverse effects of reflections due to two or more devices simultaneously seeking access to the bus are minimized by confining such reflections to parts of the bus remote from the devices. This is achieved by preventing the amplitude of a signal at a receiving station on the bus from exceeding a predetermined level; and integrated circuit serving as a near ideal diode clamped to a reference voltage performs this function.

5 Claims, 15 Drawing Figures

SELECTIVELY CLAMPED DIGITAL SIGNAL TRANSMISSION SYSTEM

This invention relates to a digital transmission system, for example, a system in which several transmitters and/or receivers are connected over a common data bus to a central controller.

If the bus in such a system is of such a length that it is to be treated as a transmission line, difficulties can arise because of reflections occurring on the line. Such a situation can occur, for example, when two devices place a signal in the form of a voltage step on the line simultaneously.

It is an object of the present invention to provide a signal transmission system in which the adverse effects of reflections are reduced.

In accordance with the invention, we provide a digital signal transmission system comprising a receiver and two or more transmitters sharing a common bus, each transmitter being adapted to apply a signal representing one binary value to said bus by changing the voltage level thereof by a predetermined amount, the other binary value being represented by effective disconnection of the transmitter from the line, in which clamping means are provided at the receiver for preventing excursions of a signal at the receiver beyond a threshold level above or equal to the amplitude of the voltage step at said receiver due to the application of a digital signal to said bus by a single transmitter and below twice such amplitude.

In a preferred embodiment of the invention, the threshold is determined by a differential amplifier circuit responsive to voltage excursions on the bus to operate as a diode clamped to a predetermined threshold voltage.

In order that the invention may be well understood, a preferred embodiment thereof will now be described with reference to the accompanying drawings, in which.

Figure 1:
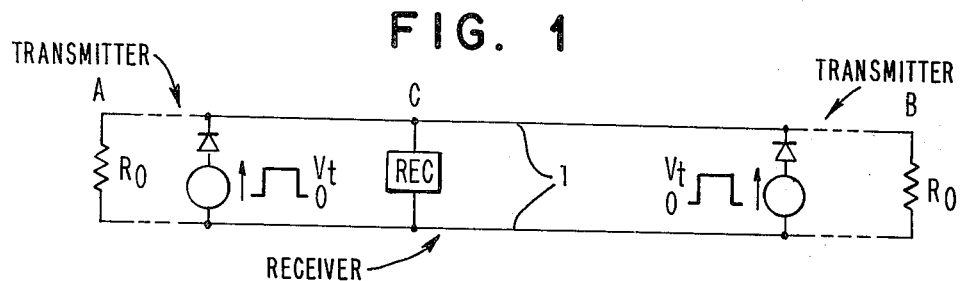
FIG. 1 shows a signal transmission system of the type to which the present invention may be applied.

Referring first to FIG. 1, a signal transmission system of the type under consideration consists of a transmission line 1 correctly terminated at its two ends by an impedance $R_o$ with transmitters and receivers placed anywhere along its length. There are, in the example shown, transmitters at points A and B on the line and a receiver at point C somewhat nearer to point A than to point B. Each transmitter could be regarded as a non-linear circuit adapted to transmit a binary "1" by applying a fixed voltage to the line and a binary "0" by being in effect disconnected from the line. A voltage generator in series with a diode performs this function and the transmitters are accordingly depicted in this way in FIG. 1. When a transmitter is transmitting a "0", this generator produces zero volts and when sending a "1" produces $V_t$ volts. The forward voltage drop of the diode is assumed to be negligible.

Figure 2A:
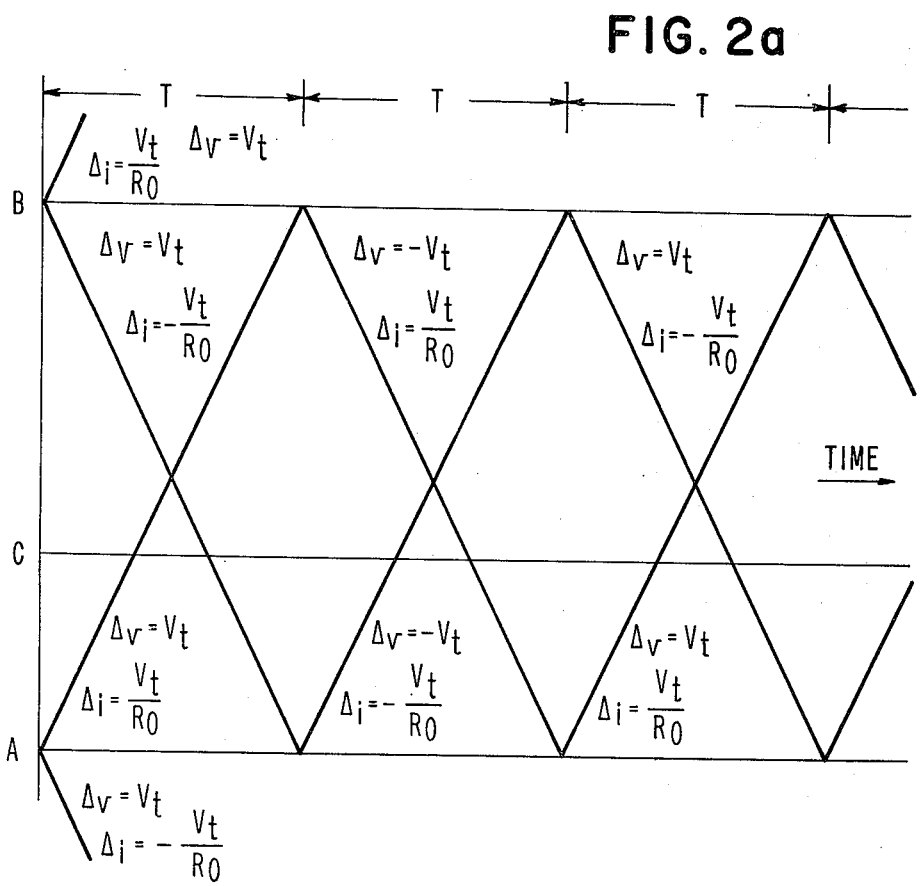
FIGS. 2a–2c are reflection diagrams displaying the signals arising at critical points in the arrangement of FIG. 1.

The reflection diagram in FIG. 2A illustrates conditions arising on that portion of the line between points A and B when the two transmitters switch from "0" to "1" at the same instant. Each transmitter launches a voltage step $V_t$ at the same instant. Each transmitter launches a voltage step $V_t$ in both directions along the bus, each diode thus initially carrying a current of $2V_t/R_o$.

Figure 2B:
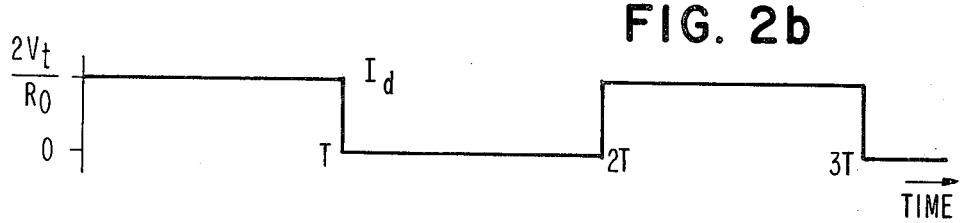
Figure 2C:
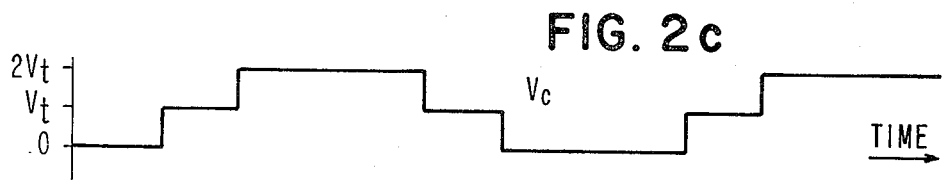

After a time T determined by the propagation characteristic of the line, the voltage step from the transmitter A will reach B and because B is presenting a mismatch, this step will be reflected as a step $-V_t$. Similarly, the voltage step launched from B will be reflected as a step $-V_t$ when it reaches point A. These reflections cause the diode current at the respective transmitters to fall to zero as shown in FIG. 2B. Further reflections will take place at time 2T, 3T, and so on, resulting in variations in diode current at each transmitter as shown in FIG. 2B. At the receiver, the value of the voltage $V_C$ at any instant is the sum of the voltage changes that have taken place up to the instant in question. The resulting waveform is shown in FIG. 2C which shows the voltage $V_C$ to the oscillatory. Bearing in mind that the function of the receiver is to sample the signal on the line to determine what is currently being transmitted on the line, it is apparent that the amplitude of the sample will depend on the time at which the sample was taken. For example, if the voltage were sampled at time T, it would be at a value $2V_t$ whereas if the sample were taken at time 2T, the sample would be zero, clearly giving a false reading.

Figure 3:
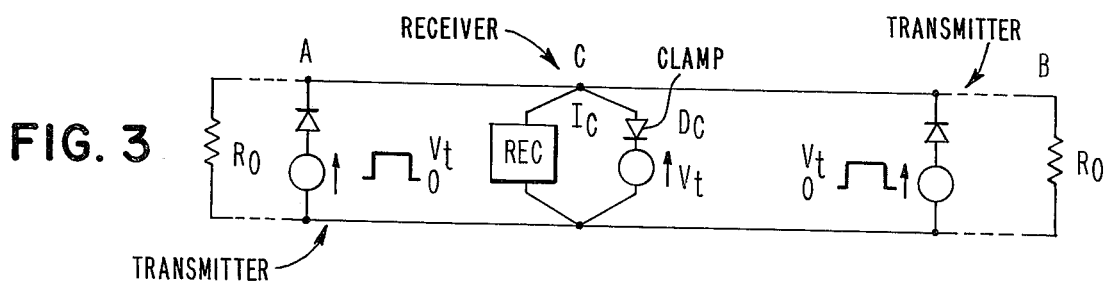
FIG. 3 shows the system of FIG. 1 modified in accordance with the invention to prevent the adverse effects of reflections.

Referring now to FIG. 3, the arrangement is seen to be generally similar to that shown in FIG. 1 with the exception that a clamp circuit is connected across the line at point C, the values of the circuit being chosen to prevent the line voltage at this point from rising above $V_t$. The effect of this clamp is shown in FIG. 4.

Figure 4A:
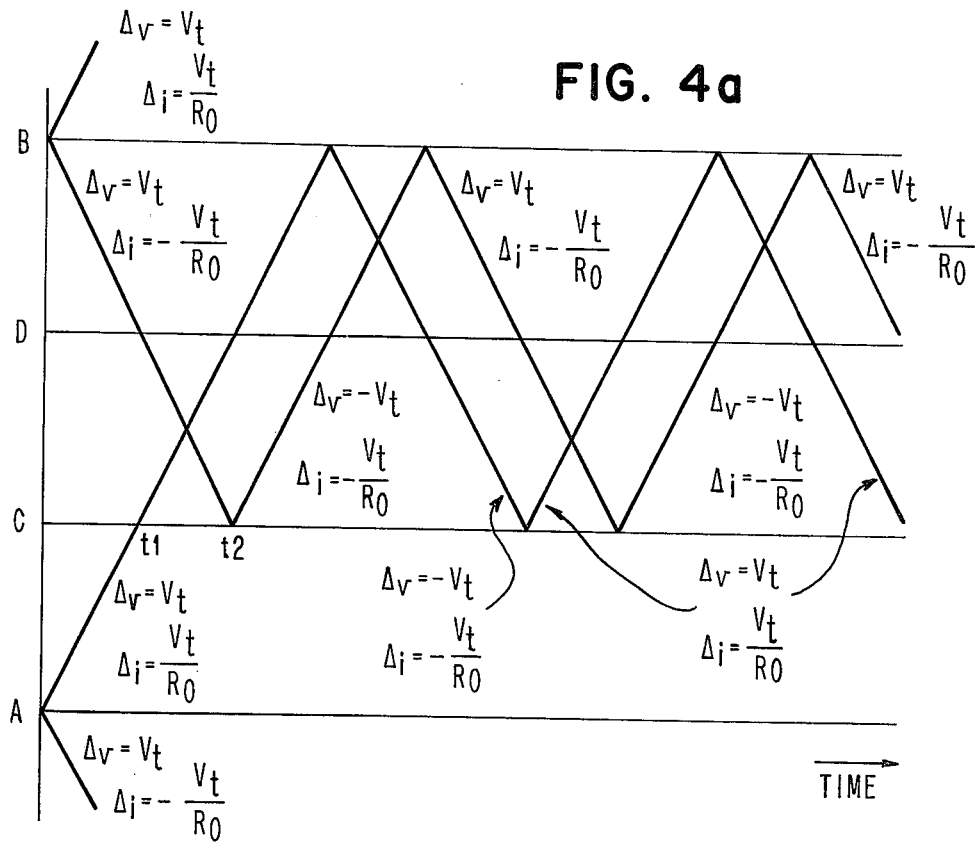
FIGS. 4a–4d are reflection diagrams showing the voltages occurring in the arrangement of FIG. 3.
Figure 4B:
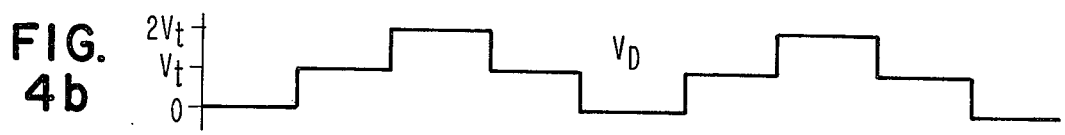
Figure 4C:
Figure 4D:
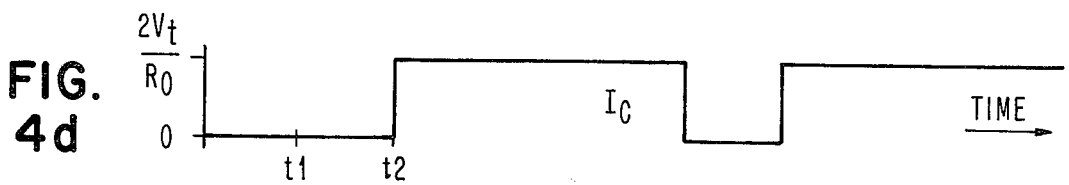

Assuming again that both transmitters A and B switch from "0" to "1" simultaneously, voltage steps will be launched therefrom simultaneously as shown at the left hand side of FIG. 4A. The initial step from transmitter A passes C at time $t_1$ raising the voltage $V_c$ to $V_t$ which is not sufficient to cause conduction in the clamp diode. When the initial pulse from transmitter B reaches point C sometime later at time $t_2$, the clamp diode prevents $V_c$ from rising any further and the step will be reflected as a voltage step $-V_t$ back toward transmitter B. Reflections will continue between B and C as shown due to both the last described voltage step and to that launched from transmitter A. The waveform between B and C will therefore continue to the oscillatory as shown in FIG. 2B for a point D midway between B and C. At point C, however, the voltage will remain clamped at $V_t$ until the transmitter voltages return to zero (FIG. 4C). The current in the diode of the clamp circuit at point C is shown in FIG. 4D from which it is seen that the effect of the reflections at this point is to change the current between 0 and $2V_t/R_o$ while the voltage to which the line is clamped remains at $V_t$.

Figure 5:
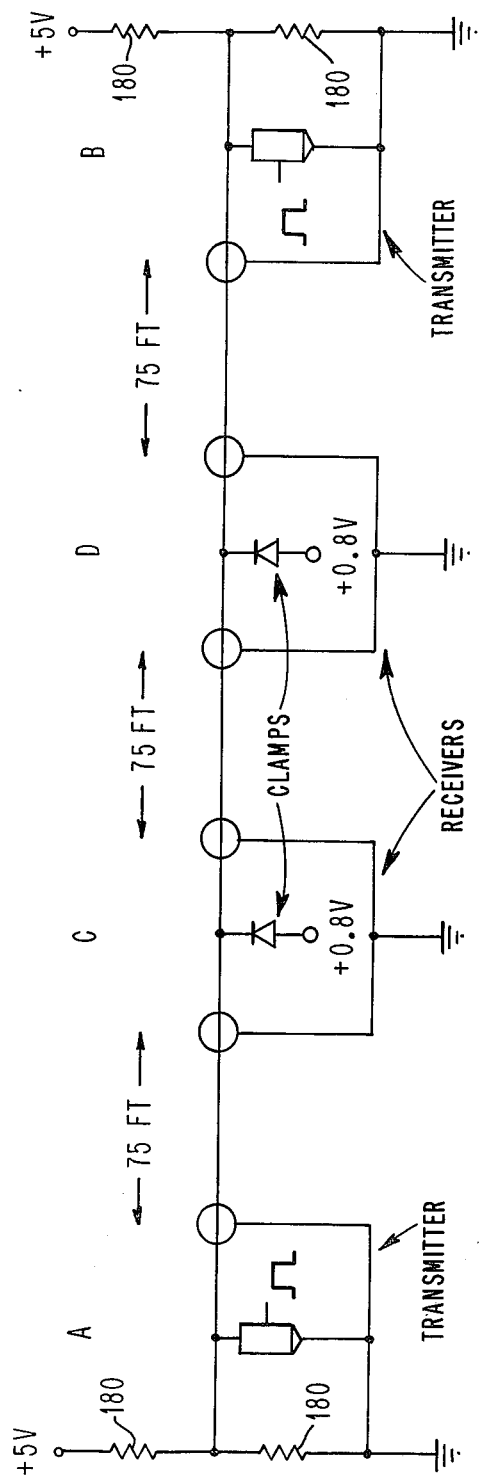
FIG. 5 shows an experimental installation embodying the invention.

FIG. 5 shows an experimental arrangement constructed for test purposes using 90 Ω co-axial line extending between four stations A, B, C and D. Stations A and B are arranged to operate as transmitters while stations C and D simulate receivers and include a diode a type BAY 74 referenced as a voltage of +0.8 volts. The distance between stations was 75 feet.

Figure 6:
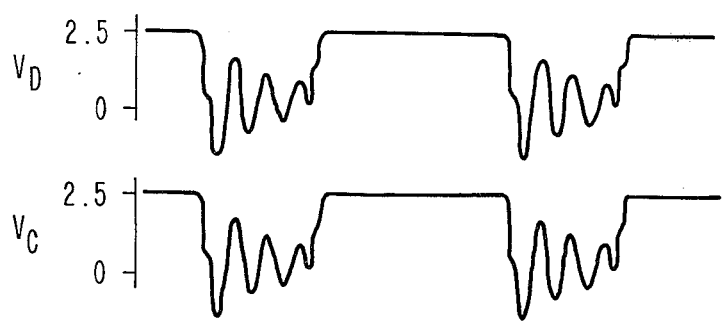
FIGS. 6 to 8 show experimental results obtained with the arrangement of FIG. 5 with and without the use of the present invention.
Figure 7:
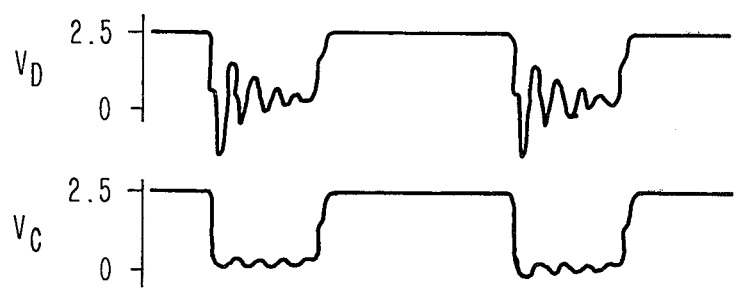
Figure 8:
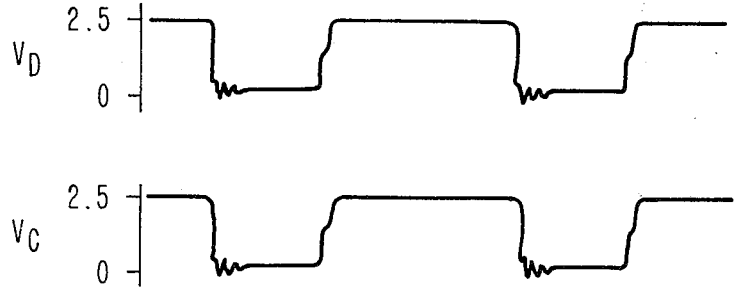

FIGS. 6 to 8 show waveforms occurring at the receivers in a variety of circumstances.

In the quiescent state, the line carries a steady voltage of 2.5 volts representing binary "0". To transmit a "1" onto the line, the transistor in a transmitting station is switched on reducing the line voltage almost to zero. The clamp at each receiver prevents the line from going negative. Under test conditions, the transmitters A and B were switched from "0" to "1" simultaneously and the oscillograms shown in FIGS. 6, 7 and 8 were observed under the following conditions:

a. no clamp at either C or D - FIG. 6
b. clamped at C but not at D - FIG. 7
c. clamps at C and D - FIG. 8.

It is thus seen that by selectively clamping the line at each receiver, oscillatory conditions are prevented at those points.

For relatively large excursions of signals on the line, a simple clamping scheme of the type shown in FIG. 5 is effective. However, in many applications, it is desirable to keep the power dissipation within given limits by maintaining the power supply voltage at as low a value as possible thus restricting the value of signal voltage that can be used. When the signal voltage approaches three or four times the forward voltage drop of the clamping diode, the clamping action becomes much less effective and it is necessary to lock to other techniques for providing clamping diode action.

Figure 9:
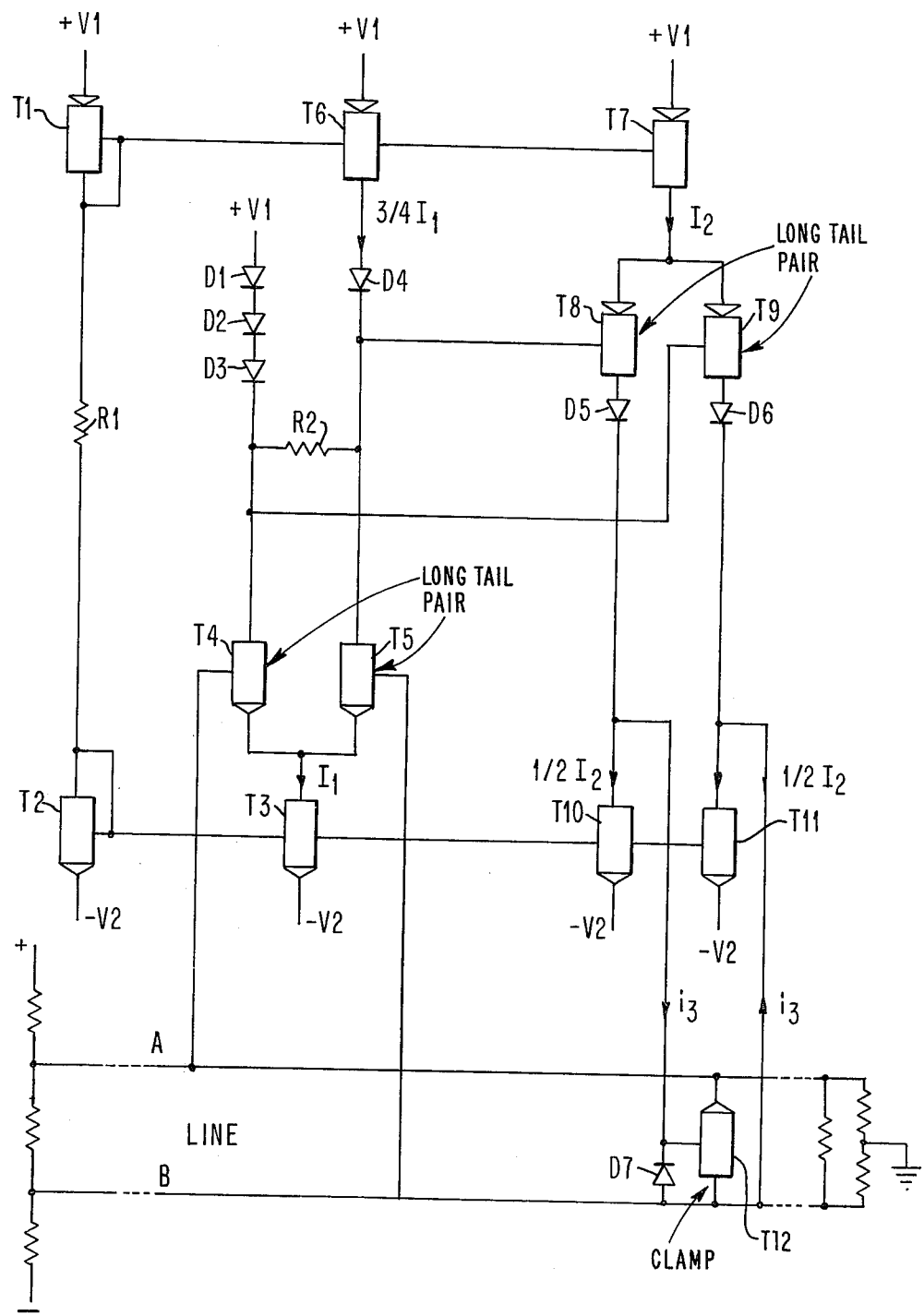
FIG. 9 shows one form of circuit arranged to function more effectively as a clamping diode in an arrangement embodying the invention.

As an example, if the usable signal amplitude is below 1 volt, the 0.7 volt drop in a silicon diode would be too great and even the 0.4 volt drop in a Schottky barrier diode could present difficulties. Ideally, the forward voltage drop should be 250 millivolts or below and there is described below with reference to FIG. 9 a circuit which exhibits this characteristic.

In this circuit, two transistors T1 and T2 are connected in series between voltage references $+V_1$ and $-V_2$ to define currents respectively for further transistors T6 and T7 and T3, T10 and T11. A current $I_{ref}$ flows continuously through T1, R1 and T2 while T3, T10 and T11 reflect the current in T2, and T6 and T7 that in T1, by the well-known current mirror mechanism. The transistors are so proportioned that the current in T6 is approximately three quarters of that in T3 while that in each of T10 and T11 is half of that in T7. These figures are shown on the diagram.

T3 defines the tail current $I_1$ for a long tail pair consisting of two transistors T4 and T5, and T7 similarly defines a tail current $I_2$ for a long tail pair consisting of transistors T8 and T9. A resistor R2 has the value $0.4/I_1$.

As long as none of the transmitters is placing a short-circuit across the line, conductor A will be more positive than conductor B, and so the whole of $I_1$ will flow through T4, leaving T5 cut off. Under these circumstances, the current ¾ $I_1$ from T6 will all flow through R2; the base of T9 will therefore be about 0.3 volts more negative than the base of T8, and so $I_2$ will all flow through T9.

As T11 can accept only ½ $I_2$, the remaining ½ $I_2$ from T9 will flow through D7 to T10 giving the current $I_3$ a value $-½ I_2$. The base of T12 will be more negative than the collector and emitter and so T12 will be cut off.

When a transmitter places a short circuit between A and B, T4 and T5 will conduct more-or-less equally and so the current in T5 will rise to $½I_1$. As T6 produces ¾ $I_1$, the remaining ¼ $I_1$ will flow through R2 in the same direction as before, giving a voltage drop of 0.1 volt. This is enough to keep practically the whole of $I_2$ flowing through T9, and so T12 will remain cut off.

If now conditions on the line cause B to become more than about 100 mV positive with respect to A, practically the whole of the tail current $I_1$ will flow through T5. T6 can supply only ¾ $I_1$ and so its collector voltage will move negative causing the current in R2 to change to ¼ $I_1$ in the opposite direction. This makes the base of T8 about 0.1 volt were negative than that of T9 and so T9 cuts off leaving the whole of $I_2$ flowing through T8. This causes $I_3$ to change from $-½ I_2$ to $+½ I_2$, switching on T12 and so placing a clamp across the line.

When B moves negative again, $I_2$ reverts to $-½ I_2$ and reverse base current is drawn from T12 until this transistor cuts off. After that, the current is diverted via D7 again.

The purpose of D4, D5 and D6 is to prevent the clamp circuit from placing a load on the line if the local power supply should fail.

Figure 10:
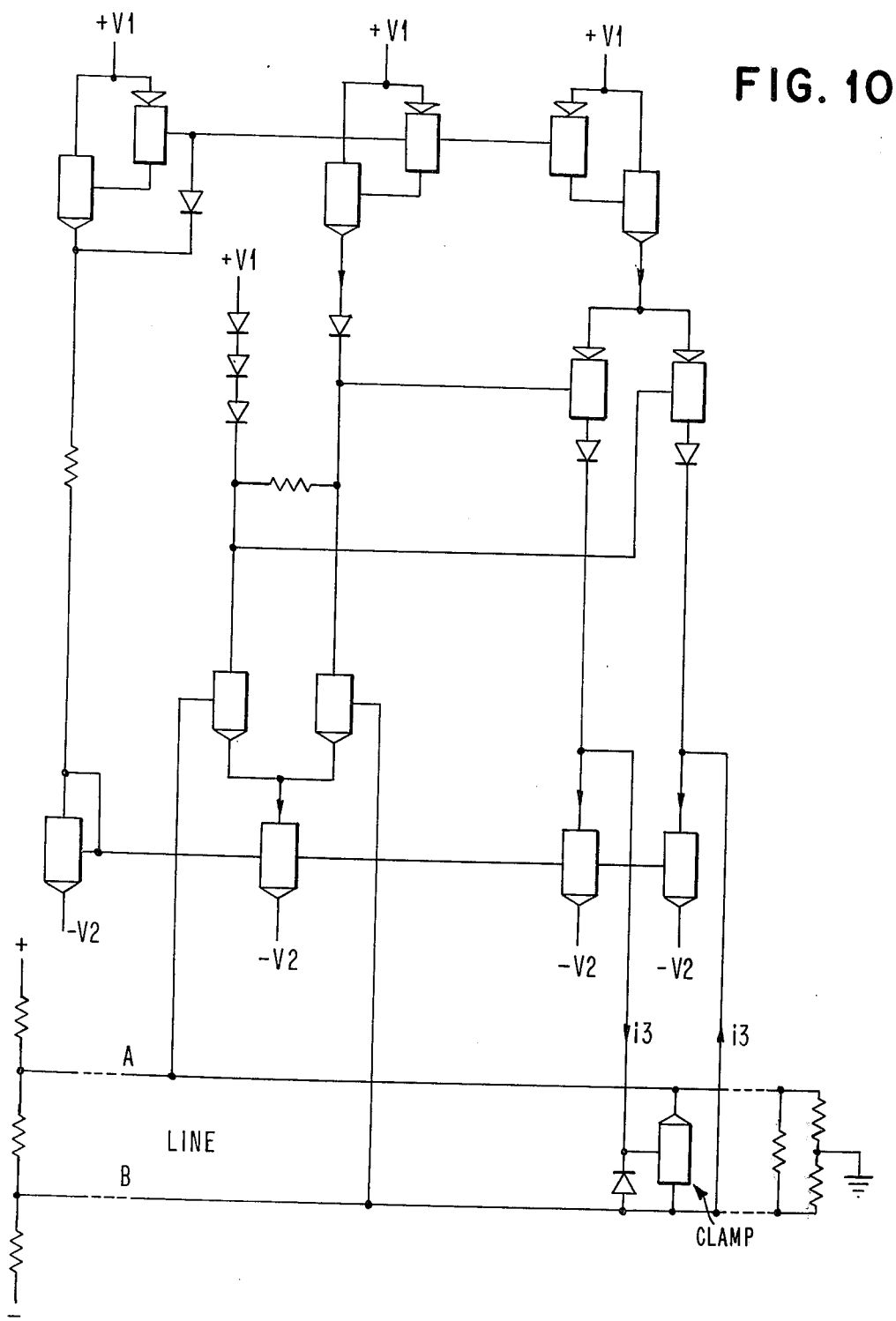
FIG. 10 shows an alternative to the circuit of FIG. 9.

An alternative circuit suitable for implementation in monolithic circuit technology is shown in FIG. 10. In this circuit, the requirement for PNP transistors has been modified since such transistors when formed on the same chip as NPN transistors tend to have a low value of beta. In the circuit of FIG. 10, each PNP transistor has been replaced by a PNP/NPN pair. The circuit of FIG.. 10 performs precisely the same function as that shown in FIG. 9.

While one form of clamping circuit has been shown, it will appreciated by those skilled in the art that other forms can be used without departing from the scope of the invention. For example. it is known that diodes may be simulated by appropriately connected operational amplifiers which exhibit a low value of forward resistance. Such an arrangement would be appropriate to the application discussed above although if full advantage is demanded of a balanced line system, the performance of such a circuit may be found to be inferior to that of the circuits discussed. Further, while in the examples discussed, the clamping threshold has been close to the value of the voltage step received at a receiver when a single transmitter is activated, useful results have been obtained with higher thresholds, provided of course that the clamping level is below twice such value. A good working range appears to extend up to about 50% above the voltage step value.

While the invention has been particularly shown and described with reference to preferred embodiments thereof, it will be understood by those skilled in the art that various changes in form and details may be made therein without departing from the spirit and scope of the invention.

What is claimed is:

1. A digital pulse signal transmission system comprising:
   at least one receiver;
   at least two transmitters;
   a bus having at least two conductors interconnecting said receiver and transmitters;

each of said transmitters including means for applying binary coded electric signals to said bus, said binary coded electric signals representing one binary value by appling a first predetermined voltage to the bus conductors and said other binary value by applying a second predetermined voltage to the conductors, said receiver including clamping means connected across the bus, circuit means connected to the bus and responsive to the bus voltage for providing a control signal when the voltage on the bus conductors exceeds a predetermined value which is above or equal to one of the said applied predetermined voltages; and not more than twice the said one applied predetermined voltage, and means for applying the said control signal to the said clamping means for operating said clamping means to prevent a signal voltage excursion beyond the said one predetermined value.

2. A system as claimed in claim 1 in which said one predetermined value is in the range between said one predetermined voltage 1.5 times said one predetermined voltage.

3. A system as set forth in claim 2 in which said clamping means includes a diode referenced to said one predetermined value.

4. A system as set forth in claim 2 in which said clamping means includes a switching transistor operable under control of said control signal to maintain the potential difference between the bus conductors at a level at or below the said one predetermined value.

5. A system as set forth in claim 4 in which the said receiver circuit means includes first and second long tail pair circuits, connected in cascade, a constant current source connected to each tail for controlling the tail current, said first long tail pair circuit being responsive to a change in the potential difference between said two bus conductors to change the direction of flow of a defined portion of its tail current and said second long tail pair circuit being responsive to such direction of flow to control the state of conduction of said switching transistor.

* * * * *